Nov. 9, 1965  P. NILSSON  3,216,470
METHOD AND A MACHINE FOR PRODUCING WOOD PARTICLES
Filed July 8, 1963  8 Sheets-Sheet 2

Nov. 9, 1965 P. NILSSON 3,216,470
METHOD AND A MACHINE FOR PRODUCING WOOD PARTICLES
Filed July 8, 1963 8 Sheets-Sheet 3

United States Patent Office 3,216,470
Patented Nov. 9, 1965

3,216,470
METHOD AND A MACHINE FOR PRODUCING WOOD PARTICLES
Philip Nilsson, Soderhamn, Sweden, assignor to Soderhamns Verkstader AB, Soderhamn, Sweden, a corporation of Sweden
Filed July 8, 1963, Ser. No. 293,486
Claims priority, application Sweden, July 9, 1962, 766/62; June 28, 1963, 7,198/63
18 Claims. (Cl. 144—326)

This invention relates to a method for producing wood particles and to a machine for carrying the method into effect.

Previously it has been proposed to cut wood pulp particles and the like essentially free from compression, viz. with a compression in the cut of the order of 5% or preferably even less. According to such previous proposals there are cut from the side surfaces of the logs strip-shaped portions, the width and thickness of which correspond to the length and the thickness respectively, of the wood chips, and which portions are broken in the length direction thereof into separate wood particles or chips. The strip-shaped portions are cut in such a manner that the fibres are oriented essentially crosswise of the strips. When said strip-shaped portions are cut there are formed shallow grooves in the logs, between which grooves there are left ridges of a cross-sectional shape essentially corresponding to that of said grooves or said strip-shaped portions. Normally, the cutting knives for cutting said strip-shaped portions are disposed on a drum and spaced from each other in a row perpendicular to the cutting direction, in which case they are followed by scraper knives, which are arranged alternately with the first mentioned knives and are adapted to sever the said ridges from the logs.

With respect to the quality of the chips so produced the compression free cutting of wood particles or chips has resulted in a very great improvement. However, in practice the hitherto proposed methods of obtaining a compression free cutting of wood chips are combined with certain drawbacks, as will be discussed in more detail below.

In a very broad sense, a machine for cutting wood chips according to the compression free cutting method may be said to resemble a grinding machine for producing mechanical pulp in as much as it has a vertical magazine above a drum, which is equipped with special cutting or chiseling knives. The magazine, which has an area of the order of 1.5 m.² must always be maintained filled up to a certain minimum level to ensure that the logs are pressed satisfactorily into engagement with the drum and are prevented from rotation, and the total weight of the logs in the magazine together with the pressure which is dependent of on the movement downwardly of the feeding devices along the sides of the magazine may with an opening area of 1.5 m.² result in a total pressure of 15 tons. Naturally, the logs exert a very considerable frictional drag on the drum, and the power which is necessary to overcome such a drag may be of the order of about 200 H.P. To this must be added the necessary power for the chiseling or cutting operation.

Various considerations require a comparatively low peripheral speed of the drum, i.e. a comparatively low cutting speed, viz. of the order of about 3–4 m./sec., and with these power requirements such a speed, as a practical matter, may only be obtained by means of a reduction gearing between the driving motor of the drum and the drum shaft. It is evident that the necessity of maintaining a certain minimum leevl in the magazine together with the necessity of using a reduction gearing require that every chip cutting machines as hitherto known for compression free cutting must be dimensioned for a certain capacity, and that it is not possible to depart from such a designed capacity to any appreciable degree. This may lead to a certain over-production, and in this connection it is interesting to note that the wood chips as so produced are not suitable for to storing in silos and so on, as the wood chip is of such a character that it tends to bind in a coherent mass which may be broken only with difficulty. In other words, the natural angle of repose of the chip mass may indeed be negative.

Thus, to obtain the quality improvement of the wood chips as mentioned above it will be necessary with the hitherto known methods for compression free cutting of wood chips to accept at least the following drawbacks, viz.:

(a) The necessity of cutting the logs into lengths of 1.5 m. for instance to adapt the logs to the size of the magazine;

(b) The efficiency is low because a large amount of power amount is required for overcoming the friction and only a small amount of power is utilized for cutting;

(c) High initial costs in as much as in addition to a powerful motor there must also be provided a strong reduction gearing with a considerable reduction ratio;

(d) Production or storing problems in that the chip cutting machine has to be designed for a predetermined, non-controlable capacity;

(e) Log feeding problems in that the machine if it is correctly designed in other constructional respects will have such a high capacity that it is difficult to maintain the minimum level in the magazine.

In view of the amounts with which the pulp- and board-industry is otherwise concerned as well as in view of the very considerable quality improvement of the wood chip, as already mentioned, at least certain of the above recited drawbacks will be reduced in their significance in actual practice, but if they could be avoided entirely this would mean a further and very considerable improvement.

The present invention has for its object to remedy the above mentioned drawbacks entirely, and to this end the method according to the invention is essentially characterized in that the strip-shaped portions are severed from the log starting from one end thereof, in which case successive cuts, by moving the log lengthwise, are displaced on one hand lengthwise of the log and on the other hand crosswise of the log in such a manner that the cut surface of the log in each case is a stepped end surface which is inclined with respect to the longitudinal dimension of the log.

The invention will be disclosed in more details hereinafter with reference to the accompanying drawings.

Figure 1:
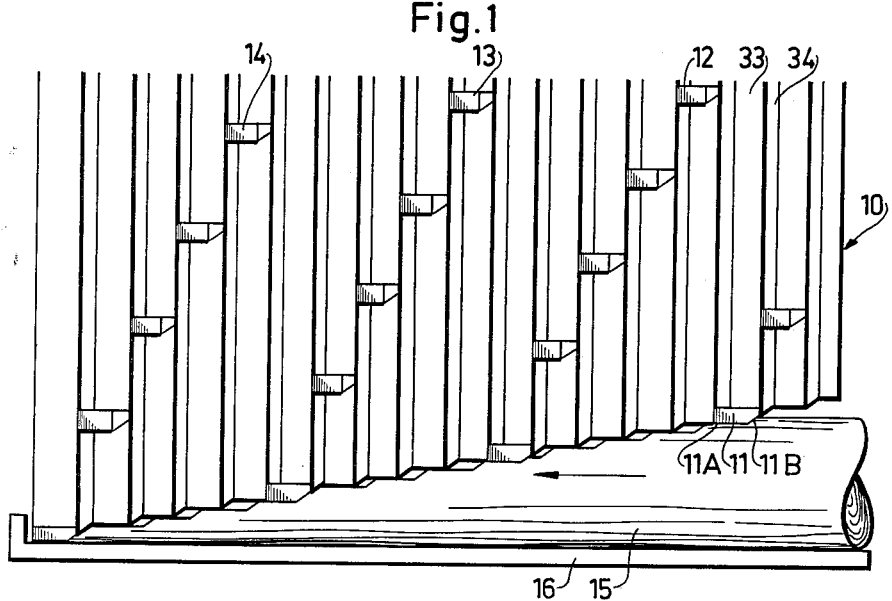
FIG. 1 shows in a very diagrammatic form how the method according to the invention is carried into practice while using a conical drum.

In FIG. 1 there is disclosed a rotary, conical drum 10, which is equipped with a plurality of cutting knives 11, 12, 13, 14, disposed in groups in helical form around the central axis of the drum 10. A log or other piece of wood 15 supported by a guide 16 is fed into engagement with the outer surface of the drum 10.

Each one of the knives 11, 12, 13, 14 severs a strip from the side surface of the log 15 which strip has a cross-section in the form of a parallelogram. Naturally, the fibres in each strip run crosswise of the strip. The strips shaped portions are severed from the log by means of two cuts, which lie in planes that are inclined with respect to each other. One of the cutting planes corresponds to the fiber orientation in the log, as is exemplified by the cutting plane 11A whereas the other cutting plane is inclined with respect to the fibre-orientation or is intersected by the fibre-orientation, as is exemplified by the cutting plane 11B.

The drum 10 is rotated about its axis and the log 15 is fed continuously in the longitudinal direction thereof on the guide 16, as is shown by an arrow in FIG. 1, for which reason the cutting knives will sever the strips from the log starting at one end thereof, in which case successive cuts, due to the longitudinal feeding of the log, will be displaced on one hand lengthwise of the log and on the other hand crosswise of the log in such a manner that the cut surface of the log in each case will be a stepped end surface which is inclined to the longitudinal dimension of the log.

Due to the continuous feeding of the log 15 the cuts will not be wholly straight but rather slightly curved, but this circumstance is entirely immaterial in the present case. Naturally, the severed strips will be broken longitudinally so that separate wood chips or particles are obtained, and this breaking occurs almost immediately after the cuts have been made in the log. Thus, no coherent strips are formed although strips have been mentioned in this specification for convenience.

In general terms it may be said that the present invention contemplates a lengthwise feeding of the logs, rather than the previously proposed crossfeeding, thereby providing compression free chip production. This lengthwise feeding may be carried into practice in three slightly different ways:

First, it is possible to use a conical drum with cutting knives, and feed the logs to the drum in a direction substantially parallel to the rotational axis of the drum, as shown in FIG. 1.

Figure 2:
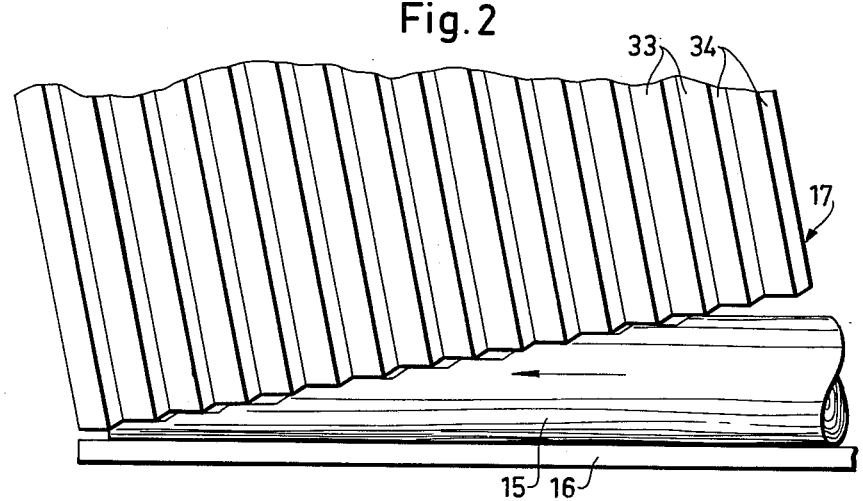
FIG. 2 shows, similarly very diagrammatically, how the method according to the invention is carried into effect while using a cylindrical drum.

Secondly, it is possible to use a cylindrical drum 17 with cutting knives, and to feed the logs to the drum in a direction which is inclined to the rotational axis of the drum, as is shown very diagrammatically in FIG. 2.

Thirdly, it is also possible to use an essentially plane disc with cutting knives, on to which the logs are fed substantially radially and at an angle which forms a very acute angle between the working surface of the disc and the feed direction of the logs.

For each one of these slightly different methods a plurality of modifications are possible. Thus, for instance, it is possible to arrange a plurality of separate feeding tracks around one and the same drum or disc. Also, dependent on other constructional requirements, it is possible to either arrange a pocket for receiving the wood chips in front of each knife or chiseling steel, or to make the drum hollow or form the disc with let-through openings, in which case the logs are fed to one side of the drum or disc, whereas the wood chips are discharged on the other side thereof. When a drum is used this may naturally be designed either for feeding from the outside and inwardly or feeding from the inside and outwardly in case such drum is formed with openings for the wood particles. Naturally, it is also possible to arrange a drum with the rotational axis thereof inclined with respect to the horizontal or arrange it vertically so that the withdrawal of the wood chips from the drum is by way of gravity to a conveyor for instance or suitable container is enabled.

To carry the above mentioned longitudinal feeding into practice it is evident that the feed direction of the log must be parallel to the rotational axis of the drum, if a conical drum is used, or form an acute angle with the rotational axis, if the drum is cylindrical, or form an acute angle with the working surface of the disc, if a knife-equipped disc is used. At least at present it is believed that the cutting action of the knives in such a case will be sufficient to result in that the logs will be drawn toward the drum or disc. To promote this feed effect it is possible to let the logs move lengthwise under the action of the gravity, but it is also possible, besides the said mutual orientation of the feed direction and the rotational axis, where they are situated in one and the same plane, to arrange the mechanism in such a manner that the feed direction has one component circumferentially around the rotational axis, so that the drawing effect of the knives will be increased. However, for the reasons as set forth below, it may be preferable in practice to provide for positive longitudinal feed of the logs.

Figure 3:
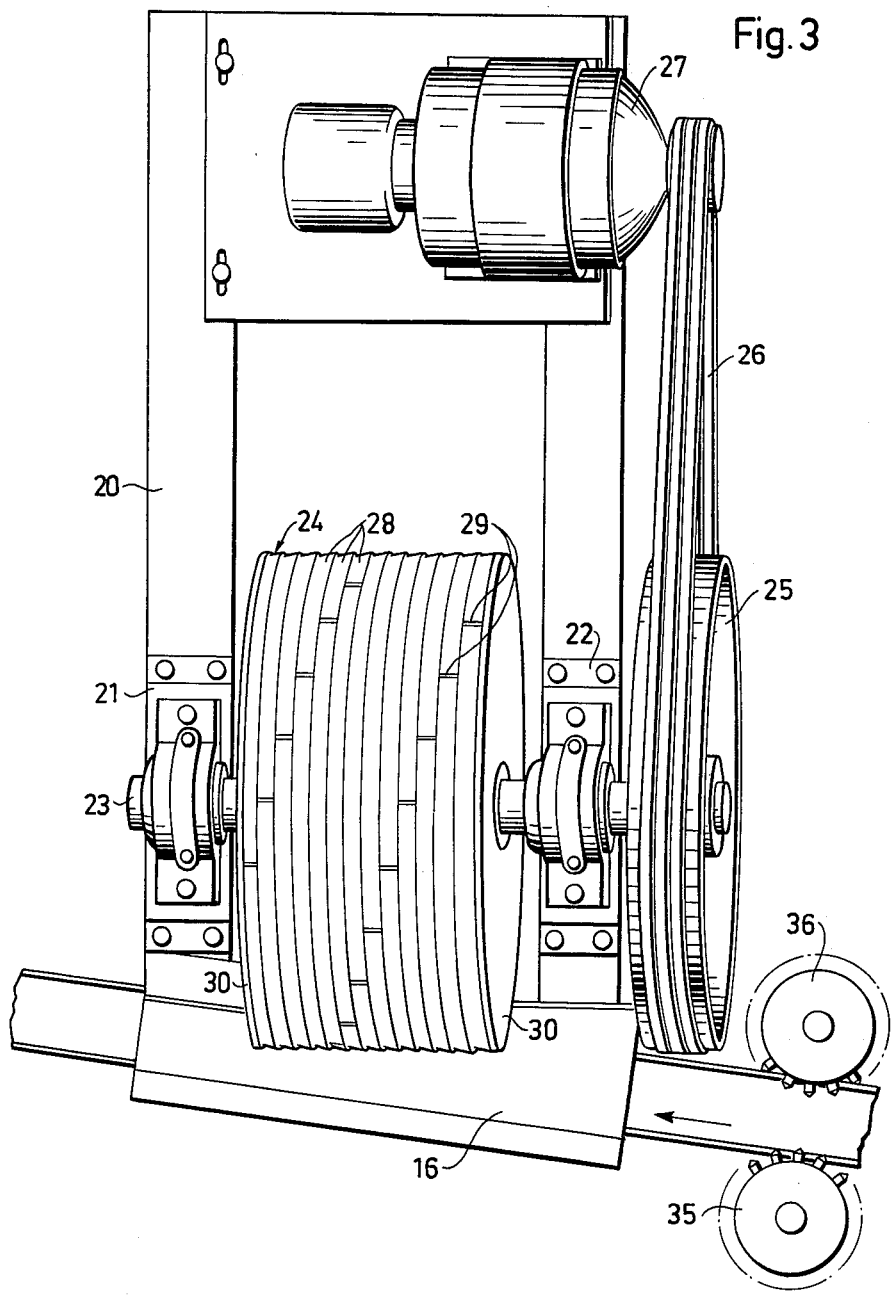
FIG. 3 is a plan view of a wood chipping machine according to one embodiment of the present invention.
Figure 4:
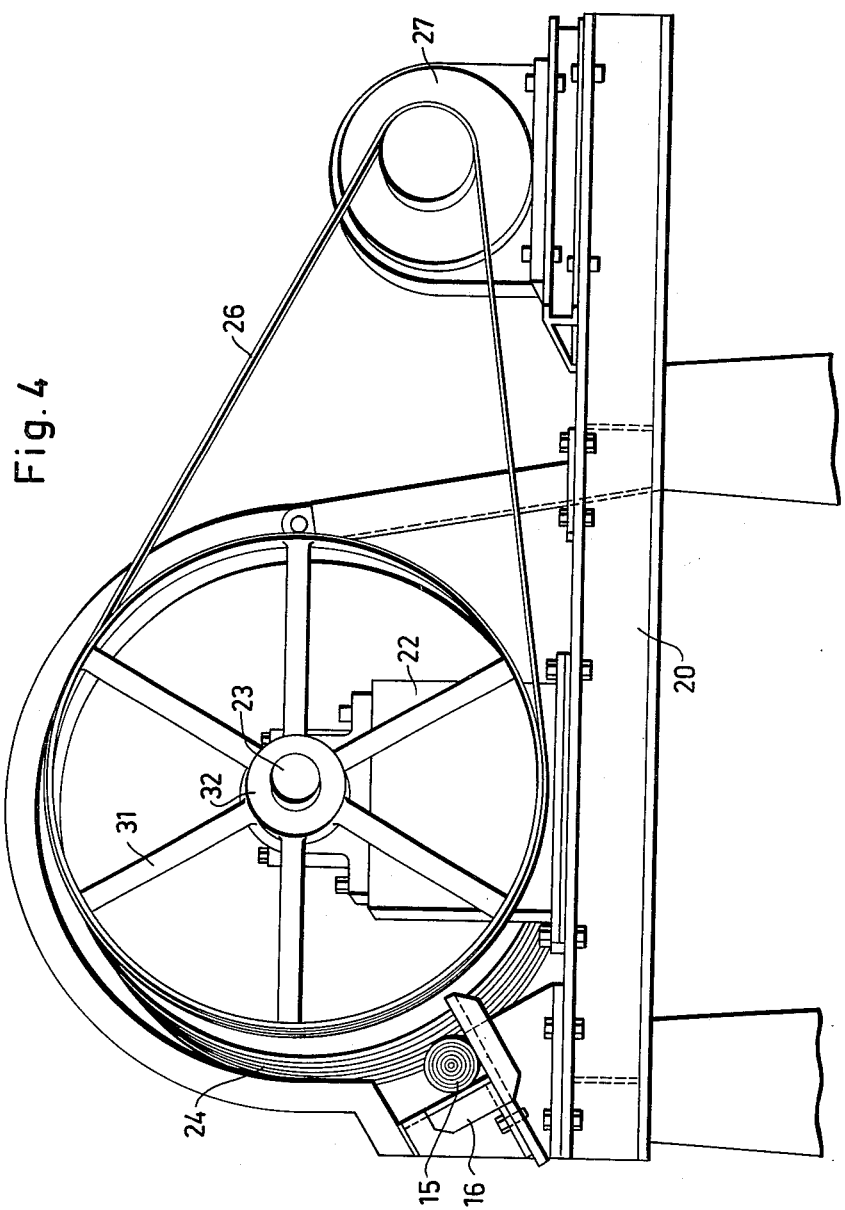
FIG. 4 is an end view of the machine in FIG. 3.

With reference to FIGS. 3 and 4 a wood chipping machine is provided with a frame 20 having two bearing supports 21, 22. In the bearings there is journalled a nearly horizontal shaft 23, which carries a drum 24 with a plurality of cutting knives. On one end the shaft 23 has a heavy pulley 25, which through belts 26 is driven by an electric motor 27, similarly secured to the frame 20. To the frame 20 is secured the above mentioned guide 16 for the logs. The guide 16 is a V-sectioned chute, and the wall adjacent the drum serves as an abutment or support member for logs during the chipping operation. The guide 16 is disposed in a plane below the horizontal plane containing the shaft 23, as is shown in FIG. 4, and in plan view, as seen in FIG. 3, the longitudinal direction of the guide and the shaft 23 form a very acute angle with each other. Naturally, if desired, it is also possible to make the guide 16 adjustable, viz. on one hand to enable a variation of the height position of the guide 16 with respect to the horizontal plane containing the shaft 23, and on the other hand to enable a variation of the just mentioned angle, which might be termed feeding angle, and also to enable a certain inclination of the guide in a vertical plane through the same. It should be noted that the general arrangement of the wood chipping machine corresponds to that as shown principally in FIG. 2.

FIGS. 3 and 4 show that the drum 24 comprises a plurality of rings 28, each provided with at least one cutting knife 29. The rings 28 are held clamped together between end plates or rings 30 by means of bolts, not shown, and the connection to the shaft is obtained by means of e.g. spokes 31 between the rings and suitable hubs 32 on the shaft 23. The outermost peripheral edges of the rings 28 are formed as shown in FIGS. 1 and 2, and more particularly in such a manner that one surface has a generating line running at least essentially in the feed direction or fibre direction, whereas a second surface has a generating line running at an angle with respect to the first mentioned direction. The first mentioned surface of every ring, i.e. the surfaces 33 in FIGS. 1, 2 and 7, acts as a guide surface for the log in that the surface thereof which has been exposed by the next preceding knife 27 will slide on to the surface 33 due to the longitudinal feed of the log, as should be evident from FIGS. 1 and 2. This prevents any tendency of the log to turn or otherwise move, for which reason a very uniform wood chip will be obtained. The second surface of every ring, i.e. the surfaces 34 in FIGS. 1, 2 and 7, acts as an abutment surface and prevents feeding of that the log a distance greater than the amount which corresponds to the desired length of the chips. Also this should be evident from FIGS. 1 and 2.

It should be noted that the drum 24 in FIGS. 3 and 4 has been shown with a rather small axial length for convenience. In practice, as many rings are brought together to form the working surface of the drum in the feed direction as are necessary to accommodate any normally encountered log cross section. However, to avoid exceeding acceptable dimensional limits it is also possible to arrange cutting knives near the foremost end of the drum in the feed direction, which knives then reduce the log section down to the permissible value in each case. Naturally, the wood chips as so produced will not be of the same quality as the chips produced by the compression free cutting, but the quantity of such wood chips is rather small, and thus the rather unimportant quality loss may be disregarded completely. When the quality requirements are very high it is of course possible to separate the quality classes from each other.

Although it has been mentioned above that the feeding may be obtained as a consequence of the drawing effect of the cutting knives is probably preferable to provide for positive feeding. To this end FIG. 3 shows diagrammatically two rollers 35, 36, of which at least one is driven in a manner not shown. Preferably, the feeding rate of the rollers 35, 36 is so chosen with respect to the axial length of the guide surfaces 33 on the drum, and the mutual circumferential distance between the cutting knives 29 is so chosen that the surfaces of the log which are inclined with respect to the fibre direction are closely adjacent or in contact with the next following abutment or stop surface 34 on the drum when a new knife 29 engages the log in the corresponding position. However, it is also possible to arrange the feeding device for a variable feeding rate. By providing a slightly higher than normal feeding rate it would be certain that the surfaces of the log that are inclined with respect to the fibre direction engage with the stop surfaces 34 when the cutting knives engage the log and by a smaller feeding rate shorter chips would be obtained, if such shorter chips were desired.

Figure 5:
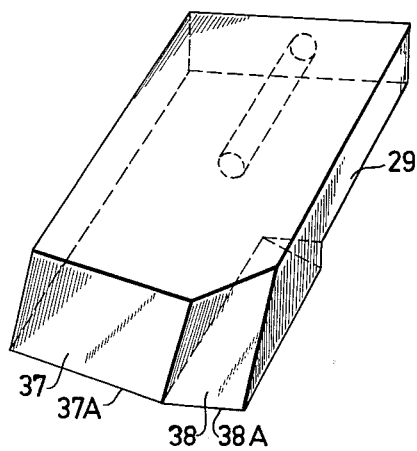
FIG. 5 is a perspective view of a cutting knife.
Figure 7:
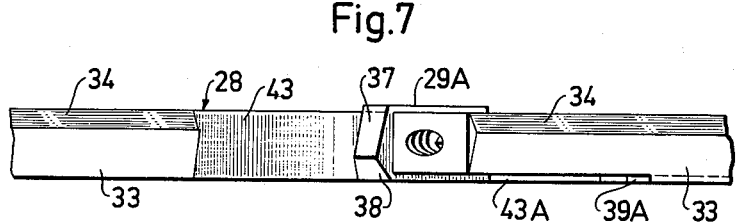
FIG. 7 is a plan view of the ring portion in FIG. 6.

Now, it only remains to describe the cutting knives 29 and how they are secured to the rings 28. As is shown in FIG. 5 each knife 29 consists of an essentially rectangular body, adapted to be inserted into a slot in the respective ring 28. Each knife 29 is slightly inclined with respect to radial planes of the ring 28, and the outer end of the knife protrudes slightly beyond the outer periphery of the ring. At the protruding end the knife 29 has a longer cutting edge 37 which is adapted to make a shaving cut in a plane containing the fibre direction, i.e. a plane wherein the feed direction lies. FIG. 7 shows clearly that the edge of the edge surface 37 is not parallel with the rotary axis of the ring, and it will be realized that the ring 28 in FIG. 7 is intended for a cylindrical drum of the kind as shown principally in FIG. 2. If the ring was intended for a conical drum according to FIG. 1, then the said edge line would naturally run parallel to the rotational axis of the drum. From one end of the edge line 37A there extends the edge line 38A of a second cutting edge surface 38, inclined at an obtuse included angle with respect to the edge line 37A, i.e. in such a manner that it takes a parting cut in a plane which is inclined to the fibre direction. In the cutting direction this other edge line 38A is inclined rearwardly in the plane of the cutter from the edge line 37A, which results in that the strip is first severed by a shaving cut from the log underneath so that it may expand in the cross direction of the strip, i.e. in the fibre direction, whereafter the strip is severed from the log by means of the parting cut which runs at an angle with respect to the fibre direction. It should be mentioned that an angle of about 7–15° between the edge line 37A and a cross-line over the knife 29 has been found suitable, but this angle, which corresponds to the above mentioned feeding angle, is naturally chosen with attention paid to the dimensioning of the cutting machine as a whole. The edge angle at the edge line 37A is so chosen that the desired breaking of the chips is obtained.

Figure 6:
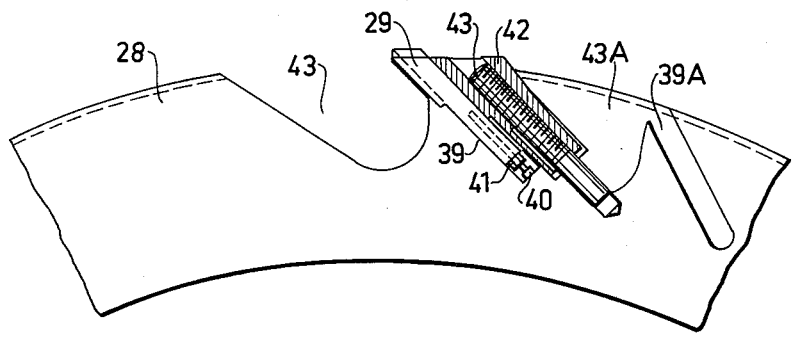
FIG. 6 shows a part of a ring equipped with a knife as shown in FIG. 5 and intended to be used as a part of the drum in the chipping machine as shown in FIGS. 3 and 4.

FIGS. 6 and 7 show how the knife 29 is secured to the ring 28. It should be noted that the knife is located in a slot 39 in the ring 28, in which a case bolt 40 with a locking nut 41 at the innermost end of the knife ensures that the knife protrudes a desired amount beyond the outer periphery of the ring 28. The knife 29 is clamped in the slot 39 by means of a wedge 42 which is pulled inwardly by means of a pin screw 43.

In front of the knife 29 the ring 28 is formed with a recess 43 which receives the chips to be thrown out under the action of centrifugal force. Behind the knife 29 the ring has on one side thereof a recess 39A, 43A, the shape of which corresponds to that of the slot 39 and the recess 43. The portion 39A is intended to receive the laterally protruding portion 29A of a knife on the next adjacent ring, and the recess portion 43A forms a widening of the recess 43 in the next adjacent ring to prevent the wood chips from being jammed therein. The disclosed arrangement with the knives protruding laterally and a recess portion to widen the recess 43 makes it very easy to ensure the above mentioned location of the knives in helical arrangement around the rotational axis of the drum. Naturally the angular distance between the recess 43 and the recess portion 43A, and the slot 39 as well as the recess portion 39A, respectively, may be chosen in any desired manner.

Among the advantages provided by the above disclosed machine are to be noted:

(a) The machine is entirely independent of the length of the wood pieces or logs;

(b) The power demand is comparatively low;

(c) The initial installation costs are comparatively low;

(d) The capacity, which may be made adjustable is suitable to the requirements of so called continuous pulp processes;

(e) Adjustments for the production of various sized wood chips are easily made;

(f) The machine is simple in its design, and servicing as well as maintenance jobs are easily done.

Figure 8:
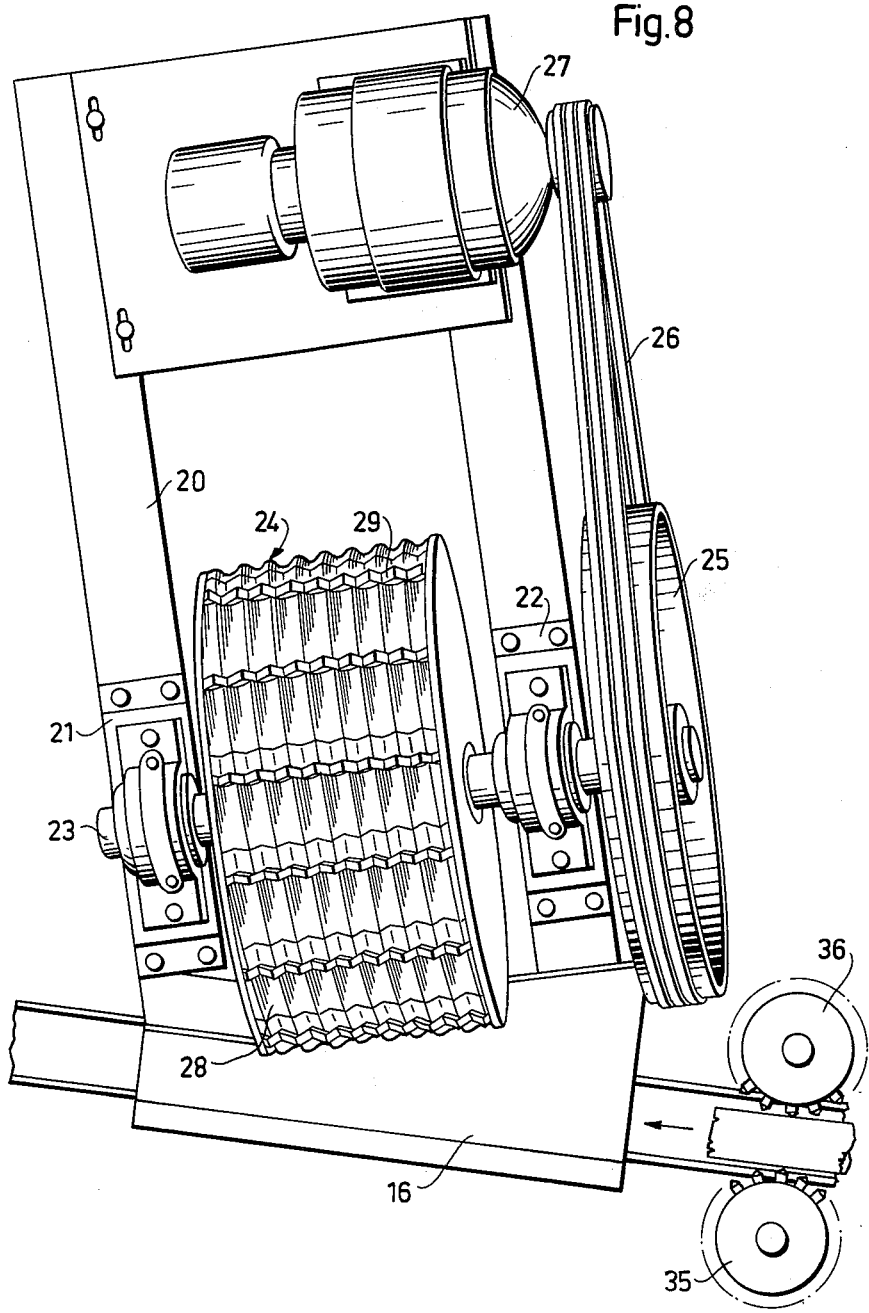
FIG. 8 is a plan view of a wood chipping machine in a second embodiment according to the invention.
Figure 9:
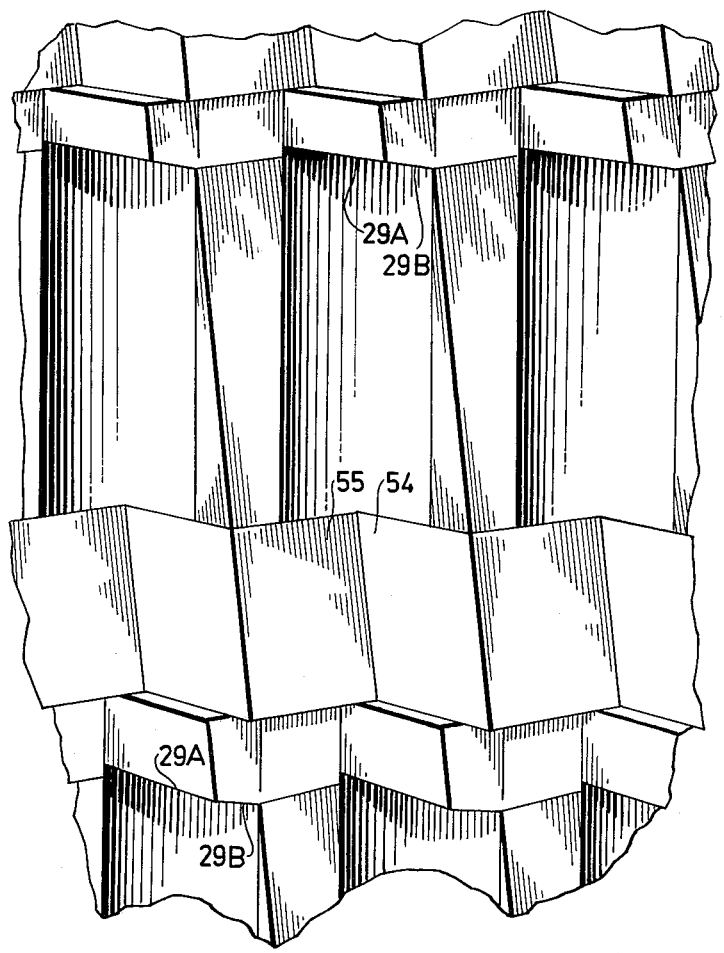
FIG. 9 is a plan view of a part of the surface of the drum as used in the machine in FIG. 8.
Figure 10:
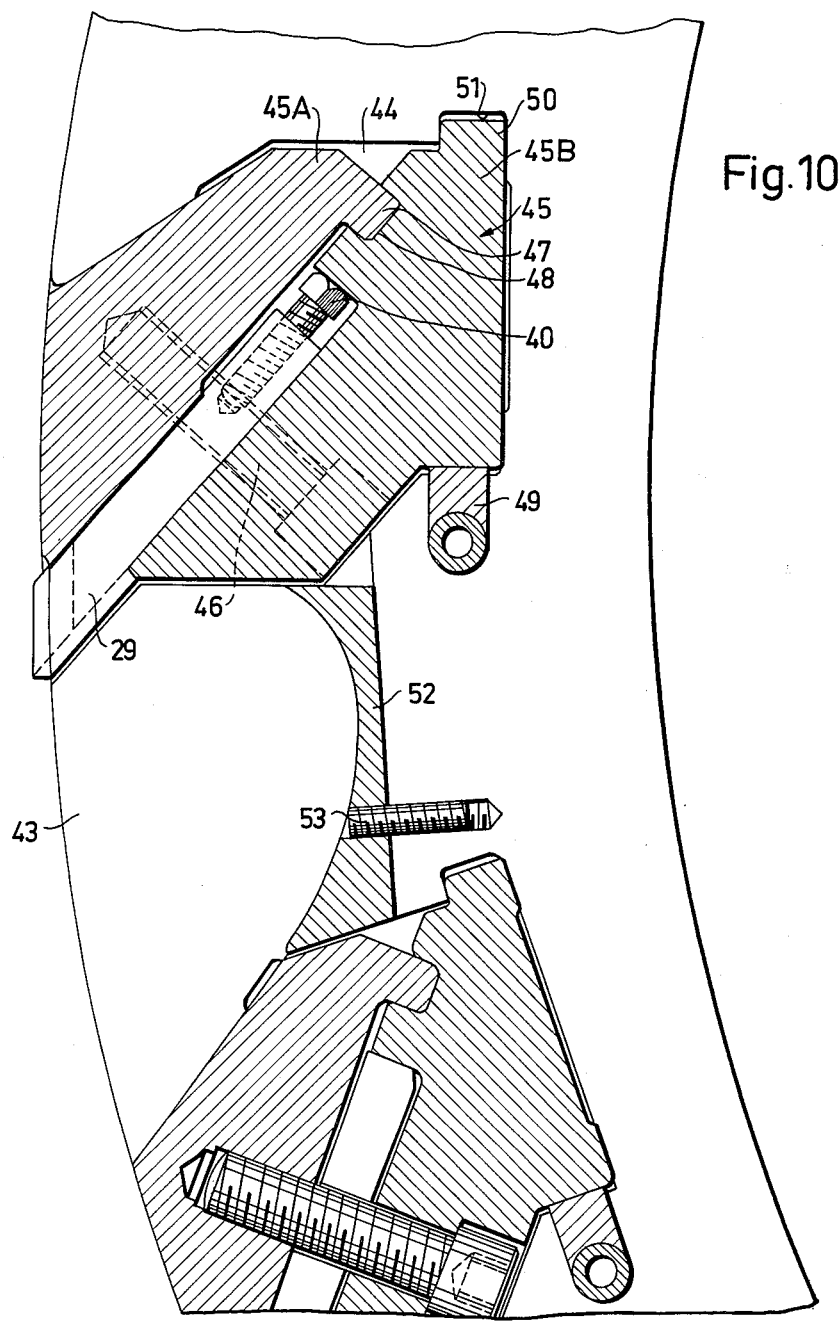
FIG. 10 is an end view and partly in section of the drum as used in the machine in FIG. 8.
Figure 11:
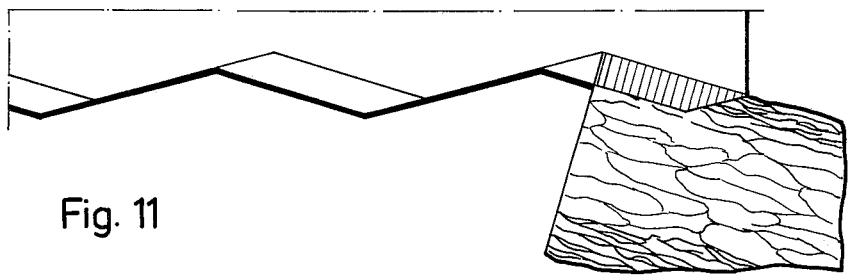
FIGS. 11–15 illustrate very diagrammatically how the chipping is carried into effect with the machine as set forth in FIG. 8.
Figure 12:
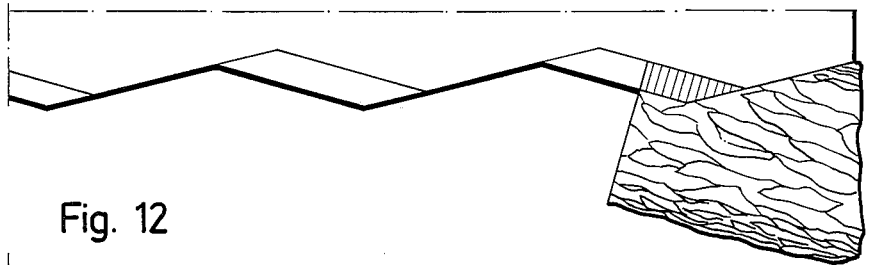
Figure 13:
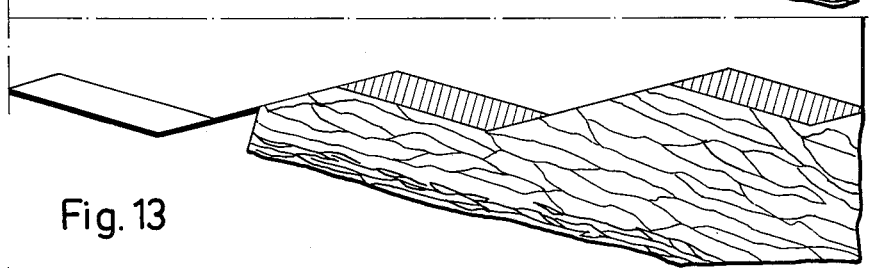
Figure 14:
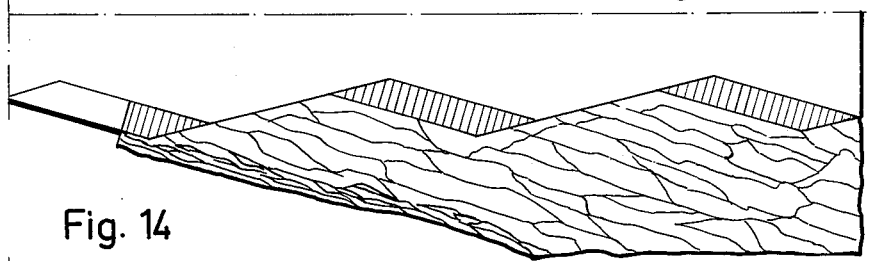
Figure 15:
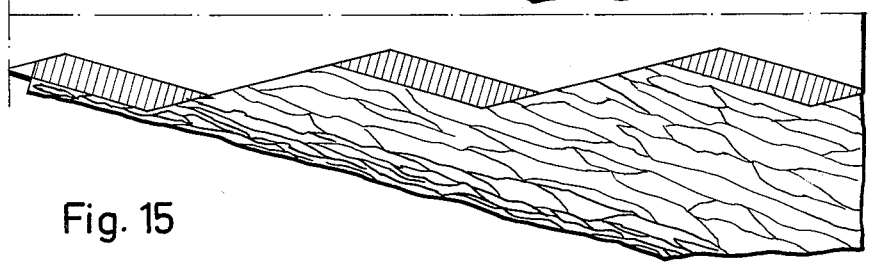

Another embodiment of the machine according to the invention is shown in FIGS. 8–10. The plan view in FIG. 8 corresponds essentially to the plan view in FIG. 3, but the angle between the shaft 23 and the feeding chute 16, FIG. 8 is double that of FIG. 3, and the drum is slightly modified.

As shown in FIGS. 9 and 10 the drum is provided with axial slots 44 in which rod shaped knife holders 45 are axially inserted. Each knife holder comprises two parts 45A, 45B, FIG. 10, which are clamped together by means of a plurality of screws 46. One of the parts is shaped with a rim 47 which extends into a groove 48 in the other part 45B for locating the parts. A plurality of cutting knives 29 are clamped between the two parts 45A, 45B. Each one of the knives has an adjusting screw 40 as set forth above. When the knives are mounted in their holders 45 the holders are axially introduced into the corresponding slots 44 in the drum and are locked in the slots by moving a locking bar 49 circumferentially of the drum, viz. in such a manner that a protrusion 50 on the part 45B is moved into a slot 51 in the drum. Naturally, the cross sectional shape of the slots 44 in the drum as well as of the holding rods is such that both the working forces due to the chipping operation and the centrifugal forces due to the rotation of the drum are counteracted in the best way.

FIGS. 9 and 10 show that in front of each knife 29 is formed a pocket 43. This pocket has a suitable form for collecting the severed strips of the log and for breaking such strips into pieces of the desired size, in the bottom thereof, the pocket has a filling piece 52 which is secured to the drum by means of a screw 53.

FIGS. 9 and 11–15 show that the drum 24 has a wave-shaped outer contour in axial section. This contour line is due to the fact that the drum is formed with spirally running slots, of which one surface 54 has the same inclination to the rotational axis of the drum as the main edge lines 29A of the cutting knives 29 whereas the other surface 55 has the same inclination to the rotational axis of the drum as the edge lines 29B which join the main edge lines and are inclined thereto. The spiral shaped or helically running slots have the same pitch direction as the feeding direction of the log against the drum, i.e. from right below and upwardly to the left according to FIG. 9. The pitch angle of the helically running slots is chosen in a suitable manner with respect to the feeding rate of the logs and the peripheral speed of the drum is in turn determined regard to the feeding angle of the log. A comparison of FIG. 9 with FIGS. 11–15 is believed to show how the chipping operation is carried out and it should only be mentioned that the logs according to FIG. 9 are fed to the drum from the right below and inclined upwardly to the left in such a manner that the fibre orientation corresponds to the direction of the main edge line 29A, so that said main edge line at the rotation of the drum will sever strips parallel to the fibre direction, which strips are then severed from the log by a cut at an angle to the fibre direction by means of the cutting edge 29B.

In a practical design the drum 24 may have an outer diameter of 1000 mm. and may be equipped with eighteen knife holders, in which the knives are arranged in axially running rows. In such a case the drum may have a pitch of 380 mm. for one turn and the helices may have six inlets. The feeding rate may be 180 mm. a turn so that by a speed of 600 r.p.m. a feeding rate of 108 metres a minute of the log will be obtained.

The last disclosed embodiment of the machine according to the invention provides the considerable advantage that the axial length of the drum may be reduced to about half that of the drum as shown in the FIGS. 3 and 4. Naturally, this is very advantageous with respect both to the installation costs and the operational costs.

Finally, it should be mentioned, that the above disclosed embodiments are intended to serve as non-limiting examples only and that several modifications and alterations as to details are possible within the scope of the appended claims.

I claim:

1. A machine for reducing a log or other elongated wood piece to chips having a cross section generally in the form of a parallelogram and with the fibers substantially free from transverse compression, said machine comprising a frame, a drum rotatably mounted on said frame, means to drive said drum, a plurality of cutting knives carried by said drum, said knives being disposed in a helical path on the drum, each knife comprising a substantially rectangular member having a shank portion removably secured on said drum, said shank portion terminating at an end remote from said drum in a transverse shaving edge extending from one side edge of said member to a point intermediate the width, a parting edge extending from said point to the opposite edge of said member, said parting edge being inclined away from the plane of said member with respect to said shaving edge and said parting edge being inclined rearwardly in the plane of said member with respect to said shaving edge, and means to feed a log longitudinally thereof and generally axially of said drum into engagement with said knives and with the fibers of said log disposed substantially parallel to said shaving edges, whereby each knife will cut a helical chip from said log with said shaving edges cutting parallel to the fibers in advance of said parting edges and said parting edges cutting across the fibers at an angle thereto to provide a chip of substantially parallelogram cross section and with the fibers substantially free from transverse compression.

2. A machine as defined in claim 1, in which said drum is cylindrical, said shaving edges being disposed at an angle with respect to the axis of said drum, and said log being fed at an angle with respect to the axis of said drum and substantially parallel to said shaving edges.

3. A machine as defined in claim 2, in which the angle between the axis of said drum and the axis of said log is of the order of 7–15 degrees.

4. A machine as defined in claim 1, in which said drum is conical, said shaving edges being disposed substantially parallel to the axis of said drum, and said log being fed substantially parallel to the axis of said drum and to said shaving edges.

5. A machine as defined in claim 4, in which the half angle of taper of said drum is of the order of 7–15 degrees.

6. A machine as defined in claim 1, in which means is provided for simultaneously feeding a plurality of logs to said knives, said logs being circumferentially spaced around said drum.

7. A machine as defined in claim 1, in which said drum is hollow, said drum having substantially radial apertures adjacent said knives, whereby chips are discharged into said drum.

8. A machine as defined in claim 1, in which said drum is hollow, the shaving and parting edges projecting inwardly of said drum, and said feeding means serving to feed logs into the interior of said drum into engagement with said knives.

9. A machine as defined in claim 1, in which said feeding means is constructed and arranged to also provide a feeding component in a direction circumferentially of said drum.

10. A machine as defined in claim 1, in which said feeding means is adjustable to vary the angle of feed with respect to said drum.

11. A machine as defined in claim 1, in which said shaving edges are of greater length than said parting edges.

12. A machine as defined in claim 1 in which said drum comprises a plurality of rings disposed in end to end relationship, opposed end plates mounted on a shaft and serving to clamp said rings together, at least one cutting knife mounted on each ring, each ring having a profile providing a log engaging guide surface substantially parallel to said shaving edge and to the fibers of the log, and also providing an abutment surface substantially parallel to said parting edge and disposed at an angle to said guide surface.

13. A machine as defined in claim 12, in which said rings are provided with recesses for receiving said knives, each knife being wider than the associated ring, and each knife having a portion of the width disposed in the recess in one ring and the remainder of the width disposed in a recess in the next adjacent ring.

14. A machine as defined in claim 12, in which each ring is provided with a chip receiving pocket adjacent the knife and in which a recess is provided in the next adjacent knife forming a continuation of said pocket.

15. A machine as defined in claim 1, in which said knives are disposed in circumferentially spaced rows on said drum, said knives being arranged to dispose the cutting edges in a plurality of helical paths.

16. A machine as defined in claim 15, and including an elongated knife holder for each row of knives, each knife holder being removably secured to said drum.

17. A machine as defined in claim 16, in which each knife holder is disposed in a slot in said drum.

18. A method of reducing an elongated workpiece to chips having a cross section generally in the form of a parallelogram with the fibers substantially free from transverse compression, said method comprising the steps of feeding said piece longitudinally, making a succession of shaving cuts generally tranversely of said piece and substantially parallel to the grain of said piece, said cuts being spaced from each other in a longitudinal direction of said piece and in stepwise relationship to effect said cuts at progressively increasing depth, making a succession of parting cuts generally across the grain of said piece, said parting cuts being spaced from each other in the longitudinal direction of said piece the same distance as the spacing of said shaving cuts and in the same stepwise relationship as said shaving cuts to effect said parting cuts at progressively increasing depths, each parting cut merging with the adjacent shaving cut at other than a right angle thereto, said shaving and parting cuts being made simultaneously with said shaving cut slightly preceding said parting cut, whereby as a result of simultaneously feeding said piece and making said shaving and parting cuts a plurality of helical chips will be removed from said piece, each chip having a cross section in the form of a parallelogram determined by the angular relationship between said shaving and parting cuts.

References Cited by the Examiner

UNITED STATES PATENTS

| | | | |
|---|---|---|---|
| 234,893 | 11/80 | Scott et al. | 144—326.2 |
| 817,382 | 4/06 | Merrill | 144—172 |
| 2,388,799 | 11/45 | Payzer et al. | 144—176 |
| 2,805,694 | 9/57 | Jones et al. | 144—172 |
| 2,847,045 | 8/58 | Brown | 144—326.2 |
| 2,884,031 | 4/59 | Standal | 144—326.2 |
| 2,969,816 | 1/61 | Johnsa | 144—172 |

FOREIGN PATENTS

| | | |
|---|---|---|
| 623,436 | 7/61 | Canada. |

ROBERT C. RIORDON, *Primary Examiner.*

WILLIAM W. DYER, JR., *Examiner.*